(12) United States Patent
Suzuki et al.

(10) Patent No.: US 11,344,927 B2
(45) Date of Patent: May 31, 2022

(54) CLEANER

(71) Applicant: TOMOEGAWA CO., LTD., Tokyo (JP)

(72) Inventors: Masayoshi Suzuki, Shizuoka (JP); Makoto Goto, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 159 days.

(21) Appl. No.: 16/342,049

(22) PCT Filed: Oct. 17, 2017

(86) PCT No.: PCT/JP2017/037520
§ 371 (c)(1),
(2) Date: Apr. 15, 2019

(87) PCT Pub. No.: WO2018/074468
PCT Pub. Date: Apr. 26, 2018

(65) Prior Publication Data
US 2019/0247895 A1 Aug. 15, 2019

(30) Foreign Application Priority Data
Oct. 17, 2016 (JP) .............................. JP2016-203311

(51) Int. Cl.
*B08B 7/00* (2006.01)
*G02B 6/38* (2006.01)
(Continued)

(52) U.S. Cl.
CPC ............ *B08B 7/0028* (2013.01); *A47L 25/00* (2013.01); *G02B 6/36* (2013.01); *G02B 6/38* (2013.01);
(Continued)

(58) Field of Classification Search
CPC .......... G02B 6/3866; G02B 6/36; G02B 6/38; A47L 25/005; A47L 13/12; A47L 25/00;
(Continued)

(56) References Cited

U.S. PATENT DOCUMENTS 5,475,890 A * 12/1995 Chen .................... A61C 15/041
15/104.2
2005/0013577 A1 * 1/2005 Koide .................. G02B 6/3807
385/134
(Continued)

FOREIGN PATENT DOCUMENTS

JP 2002-219421 A 8/2002
JP 2004-326054 A 11/2004
(Continued)

OTHER PUBLICATIONS

English Translation of International Preliminary Report on Patentability for PCT/JP2017/037520 dated May 2, 2019.

*Primary Examiner* — Robert J Scruggs
(74) *Attorney, Agent, or Firm* — Muncy, Geissler, Olds & Lowe, P.C.

(57) ABSTRACT

To provide a cleaner configured so that the cleaner can accurately remove dust and dirt, will leave less adhesive residue, and can sufficiently clean areas including an end surface of a ferrule and a guide pin. A cleaner is provided with an adhesive layer having an exposed surface facing an end surface of a connector from which a guide pin protrudes, the adhesive layer being elastically deformable when subjected to contact with the guide pin, and a holding part having a holding wall for holding the adhesive layer while exposing at least the exposed surface, the holding part being capable of bringing the guide pin into contact with the adhesive layer at a position at which the distance from the guide pin to the holding wall is greater than the length of the guide pin.

4 Claims, 7 Drawing Sheets

(51) Int. Cl.
*A47L 25/00* (2006.01)
*G02B 6/36* (2006.01)

(52) U.S. Cl.
CPC ........ *G02B 6/3866* (2013.01); *B08B 2240/02* (2013.01)

(58) Field of Classification Search
CPC ........... A47L 25/08; B08B 1/00; B08B 1/001; B08B 1/003; B08B 7/00; B08B 7/0028; B08B 2240/02; G11B 23/50
USPC ................ 15/97.1, 104.001, 104.002, 210.1; 385/134, 147
See application file for complete search history.

(56) References Cited

U.S. PATENT DOCUMENTS

| | | |
|---|---|---|
| 2005/0286853 A1 | 12/2005 | Fujiwara et al. |
| 2007/0289606 A1 | 12/2007 | Abrahamian |
| 2016/0349460 A1* | 12/2016 | Collier ................. G02B 6/3849 |
| 2018/0074267 A1 | 3/2018 | Suzuki et al. |
| 2018/0231717 A1* | 8/2018 | Takanashi ................. G02B 6/36 |
| 2019/0258010 A1* | 8/2019 | Anderson ............ G02B 6/3831 |

FOREIGN PATENT DOCUMENTS

| | | |
|---|---|---|
| JP | 2005-017756 A | 1/2005 |
| JP | 2008-180799 A | 8/2008 |
| JP | 2011-032410 A | 2/2011 |
| JP | 2013-210404 A | 10/2013 |
| WO | 2016/148226 A1 | 9/2016 |

\* cited by examiner

CLEANER

TECHNICAL FIELD

The present invention relates to a cleaner for removing dust and dirt due to adhesive force. In particular, the present invention relates to a cleaner for removing dust and dirt present on an end surface of a ferrule of connector like an optical connector.

BACKGROUND ART

A connector like an optical connector has a ferrule for holding optical fibers. When connectors are not connected to each other, an end surface of a ferrule is left exposed so that it remains in a state in which dust and dirt are easily present on the end surface of a ferrule. When dust and dirt are present on an end surface of a ferrule, ferrules cannot be closely attached with each other, and, as interrupted by air due to an occurrence of gap, an optical signal cannot be appropriately (efficiently) transmitted. Due to these reasons, various cleaning tools for cleaning an end surface of a ferrule have been devised.

As a cleaning tool for cleaning an end surface of a ferrule, a pad-shaped cleaning component having a contacting surface to be in contact with an end surface of a ferrule and formed with a flexible resin as a base material is disclosed, for example (see, Patent Literature 1, for example).

Furthermore, an optical connector cleaning tool for wiping and cleaning an end surface of a ferrule by feeding a cleaning tape is disclosed (see, Patent Literature 2, for example).

Furthermore, an optical connector cleaner having a silicone-based adhesive coated on a base material is disclosed (see, Patent Literature 3, for example).

Still furthermore, a cleaning tool having a cleaning jig including a grip part, a false plug part, and a false ferrule part projected from the false plug part; and an adhesive part on an end surface of the false ferrule part is disclosed (see, Patent Literature 4, for example).

CITATION LIST

Patent Literature

Patent Literature 1: JP 2002-219421 A
Patent Literature 2: JP 2004-326054 A
Patent Literature 3: JP 2008-180799 A
Patent Literature 4: JP 2013-210404 A

SUMMARY OF INVENTION

Technical Problem

When a ferrule is provided with a guide pin, followability to the shape of the guide pin is insufficient so that it has been difficult to sufficiently clean a root part of the guide pin. Furthermore, there is also a case in which an adhesive residue occurs on an end surface of a ferrule or a guide pin after cleaning.

The present invention is devised in consideration of those described above, and an object of the present invention is to provide a cleaner that can accurately remove dust and dirt, and simultaneously, will leave less adhesive residue and can sufficiently clean areas including an end surface of a ferrule and a guide pin.

Solution to Problem

The cleaner of the present invention is provided with an adhesive layer having an exposed surface facing an end surface of a connector from which a guide pin protrudes, the adhesive layer being elastically deformable when subjected to contact with the guide pin; and a holding part having a holding wall for holding the adhesive layer while exposing at least the exposed surface, the holding part being capable of bringing the guide pin into contact with the adhesive layer at a position at which the distance from the guide pin to the holding wall is greater than the length of the guide pin.

Advantageous Effects of Invention

Sufficient followability to the shape of a guide pin can be achieved, less adhesive residue is yielded, and areas including an end surface of a ferrule and a guide pin can be sufficiently cleaned.

DESCRIPTION OF EMBODIMENT

Summary of Present Embodiment

First Aspect

According to the first aspect of the present invention, provided is a cleaner that is provided with an adhesive layer having an exposed surface (for example, exposed surface ES or the like to be described later) facing an end surface (for example, surface of the ferrule FR to be described later) of a connector (for example, connector CN to be described later) from which a guide pin (for example, guide pin GP or the like to be described later) protrudes, the adhesive layer (for example, adhesive layer 100 or the like) being elastically deformable when subjected to contact with the guide pin; and a holding part having a holding wall (for example, side wall part 212a and side wall part 212b or the like) for holding the adhesive layer while exposing at least the exposed surface, the holding part (for example, holding body 200 or the like) being capable of bringing the guide pin into contact with the adhesive layer at a position at which the distance from the guide pin to the holding wall is greater than the length of the guide pin.

The cleaner is provided with an adhesive layer and a holding part.

The adhesive layer has an exposed surface. The exposed surface faces an end surface of the connector. The connector has a guide pin protruding therefrom. Furthermore, the adhesive layer can be elastically deformed when subjected to contact with a guide pin.

The holding part holds the adhesive layer. The holding part has a holding wall for holding the adhesive layer. When the adhesive layer is held by the holding wall, at least the exposed surface is exposed from the holding part. Among the surfaces constituting the adhesive layer, the surface other than the exposed surface may be exposed. Furthermore, the holding part is capable of bringing the guide pin into contact with the adhesive layer at a position at which the distance from the guide pin to the holding wall is greater than the length of the guide pin. As described herein, the distance indicates the length of a straight line which is perpendicular to the axial line of a guide pin and also perpendicular to the wall surface of a holding wall.

When the guide pin is pressed against the adhesive layer, the adhesive layer temporarily stores deformation and, by resolving the stored deformation, it deforms to get close to a guide pin or a connector. When the stored deformation is sufficient, the adhesive layer can deform such that it is in close contact with a surface of the guide pin or an end surface of the connector. By contacting the adhesive layer with a guide pin at a position at which the distance from the guide pin to the holding wall is greater than the length of the guide pin, deformation required for having the deformation to achieve close contact with a surface of the guide pin or an end surface of the connector can be stored. Accordingly, areas including an end surface of a ferrule or a root part of a guide pin can be sufficiently cleaned.

Second Aspect

The second aspect of the present invention is the cleaner of the first aspect of the present invention, in which the adhesive layer is perpendicular to the exposed surface and has a first adhesive side surface (e.g., side surface part 112a or the like of the adhesive layer 100 to be described later) and a second adhesive side surface (e.g., side surface part 112b or the like of the adhesive layer 100 to be described later) facing each other, the holding part has a first holding side surface (e.g., side wall part 212 of holding body 200 or side wall part 312a of holding body 300 or the like) and a second holding side surface (e.g., side wall part 212b of holding body 200 or side wall part 312b of holding body 300 or the like) facing each other, in the holding part, the first adhesive side surface and the first holding side surface face each other, the second adhesive side surface and the second holding side surface face each other, and the adhesive layer is inserted between the first holding side surface and the second holding side surface to hold the adhesive layer, and the guide pin is brought into contact with the adhesive layer at a position at which the distance from the first holding side surface and the second holding side surface to the guide pin is greater than the length of the guide pin.

Third Aspect

The third aspect of the present invention is the cleaner of the second aspect of the present invention, in which the holding part has a depth allowing, in the length direction of the guide pin, accommodation of the entire guide pin in the adhesive layer, the first holding side surface (e.g., side wall part 312a of the holding body 300 or the like) and the second holding side surface (e.g., side wall part 312b of the holding body 300 or the like) have a tip portion facing toward the connector (e.g., top end part 316 of the holding body 300 or the like), and the exposed surface is protruded beyond the tip portion.

Details of Present Embodiment

Hereinbelow, the embodiment is described on the basis of drawings.

Subject of Adhesive Layer 100

Figure 1:
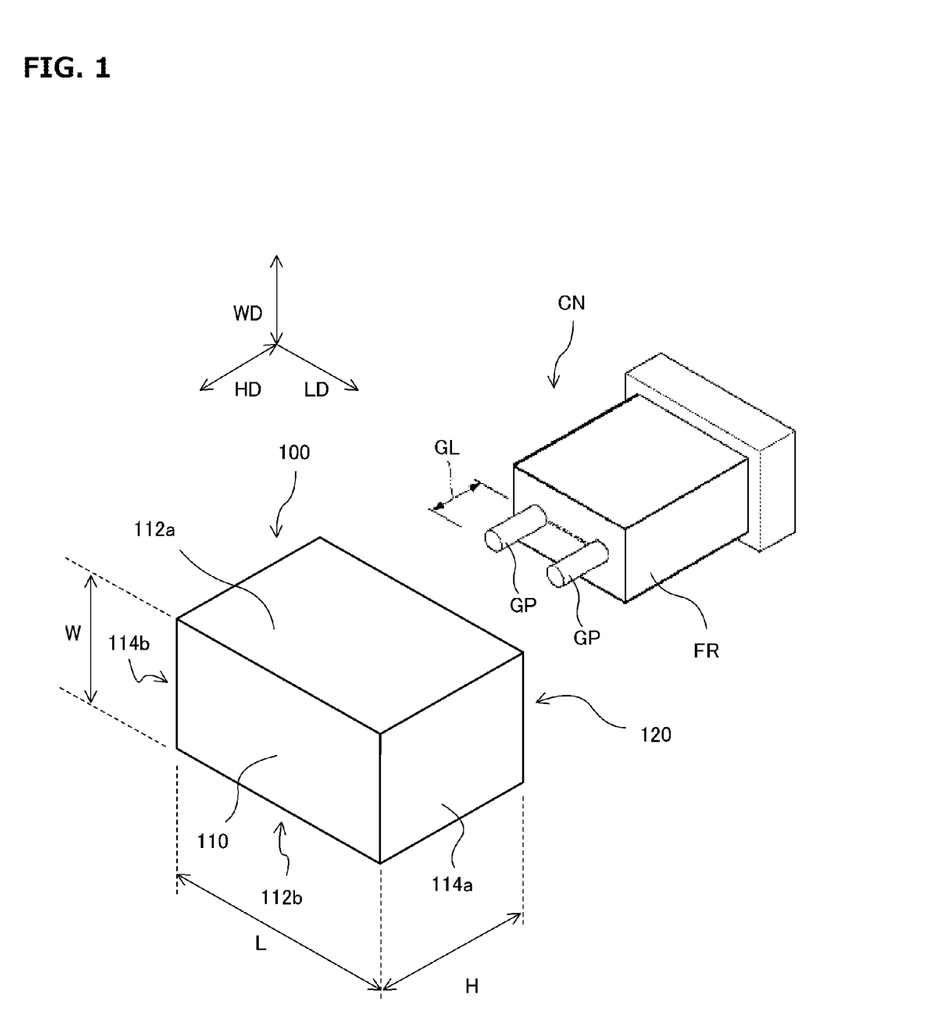
FIG. 1 is a perspective view illustrating schematics of an adhesive layer 100 and a connector CN.

FIG. 1 is a perspective view illustrating schematics of the adhesive layer 100 and the connector CN. As illustrated in FIG. 1, the adhesive layer 100 according to the present embodiment is used for the connector CN.

Connector CN

The connector CN has two guide pins GP and a ferrule FR. The two guide pins GP are provided such that, while being separated from each other, they protrude from the ferrule FR. The two guide pins GP are provided such that they are separated in a substantially perpendicular direction to the surface of the ferrule FR. On the ferrule FR between the two guide pins GP, end portions of plural optical fibers are arranged.

On a surface of the ferrule FR, various dust and dirt may be present. The adhesive layer 100 is a member for removing dust and dirt present on a surface of the ferrule FR.

Length Direction LD, Width Direction WD, and Height Direction HD

Furthermore, according to the present embodiment as illustrated in FIG. 1, the length direction is a direction LD which corresponds to the arrangement direction of end portions of plural optical fibers on a surface of the ferrule FR of the connector CN. The width direction is a direction WD which is perpendicular to the length direction on the surface of the ferrule FR of the connector CN. Furthermore, the height direction is a direction which is perpendicular to the surface of the ferrule FR of the connector CN. The height direction HD is a direction along which the connector CN and the adhesive layer 100 either approach or separate from each other.

Adhesive Layer 100

By transferring (transfer sticking) dust and dirt to an adhesive layer due to adhesive force, the adhesive layer 100 removes dust and dirt that are present on a surface of the ferrule FR.

External Shape

In a natural state free from being applied with any external force, the adhesive layer 100 has a shape of almost rectangular parallelepiped. The adhesive layer 100 has a predetermined length L, width W, and height H.

The adhesive layer 100 has a top surface part 120, four side surface parts 112a, 112b, 114a, and 114b, and a bottom surface part 110. The top surface part 120 and the bottom surface part 110 face each other and are formed substantially parallel to each other. The top surface part 120 and the bottom surface part 110 have an almost rectangular shape that is defined by the length L and the width W of the adhesive layer 100. The side surface parts 112a and 112b face each other and are formed substantially parallel to each other. The side surface parts 112a and 112b have an almost rectangular shape that is defined by the length L and the height H. The side surface parts 114a and 114b face each other and are formed substantially parallel to each other. The side surface parts 114a and 114b have an almost rectangular shape that is defined by the width W and the height H. When the adhesive layer 100 is disposed or formed on the holding body 200 to be described later, the top surface part 120 becomes the exposed surface ES.

Furthermore, although the descriptions are given herein for a case in which the top surface part 120, the four side surface parts 112a, 112b, 114a, and 114b, and the bottom surface part 110 have an almost rectangular shape for the sake of convenience, it is sufficient to have a shape which can be, as a whole, recognized or handled as an almost rectangular shape. The top surface part 120, the four side surface parts 112a, 112b, 114a, and 114b, and the bottom surface part 110 may also have, in addition to a flat shape, a shape like a curved shape in which expansion toward an outside or recession toward an inside is present, and a shape with irregularities. It is preferably a shape which can be, as a whole, recognized and accepted as an almost rectangular shape.

Furthermore, although the descriptions are given herein for a case in which the adhesive layer 100 shows a shape of almost rectangular parallelepiped, the shape may be recognized or handled as an almost rectangular parallelepiped as a whole, and it can be also a shape which has been deformed to a certain degree. The length L, the width W, and the height H of the adhesive layer 100 preferably have a length that is determined by approximation of the adhesive layer 100 to an almost rectangular shape.

Furthermore, the adhesive layer 100 is elastically deformable as it is described later, and it does not always maintain a constant shape. Similarly, due to elastic deformation, the top surface part 120, the four side surface parts 112a, 112b, 114a, and 114b, and the bottom surface part 110 also do not always maintain a constant almost rectangular shape.

Material

The adhesive layer 100 is integrally formed of an adhesive only, and the surface is also formed of the same material. Examples of the material of an adhesive include the followings.

As an adhesive used for the adhesive layer 100, those having re-peeling property, those showing no breakage even when the guide pin GP protrudes therefrom and showing no adhesive residue upon peeling, those having no peeling or occurrence of foams during a heat shock test or the like, and those having elastic deformability allowing followability to a guide pin and having restorative force against stress are desired. As for an adhesive component having those characteristics, a component suitably selected from an acrylic resin, a rubber-based material represented by butyl rubber, isoprene rubber, and styrene butadiene rubber, a polyvinyl ether-based resin, a silicone-based resin, a urethane-based resin or the like can be used. An acrylic adhesive is most preferable.

The acrylic adhesive is obtained by copolymerization of alkyl (meth)acrylic ester with polymerizable unsaturated carboxylic acid or hydroxyl group-containing ethylenically unsaturated monomer, or, even further, with a copolymerizable vinyl-based monomer, in an organic solvent or an aqueous medium. As for the polymerization, a polymerization method based on radical polymerization is suitably employed. Preferably, the polymerization is a solution polymerization, a suspension polymerization, an emulsion polymerization, or the like. As a preferred molecular weight of the copolymer, the number average molecular weight based on gel permeation chromatography (chromatography is performed in accordance with JISK 0124-83, in which TSK GELG4000+G3000+G2500+G2000 {manufactured by Toyo Soda (presently, Tosoh Corporation)} is used as a separation column, a flow rate is 1.0 ml/min at 40° C., tetrahydrofuran for GPC is used as an eluent, and the molecular weight is obtained from chromatogram obtained by an RI detector and by calculation from polystyrene calibration curve) is 10,000 to 1,000,000, preferably 50,000 to 500,000, and more preferably 100,000 to 400,000. If the number average molecular weight is less than 10,000, there is a possibility of having a difficulty in obtaining uniform forming of a resin composition layer. On the other hand, if the number average molecular weight is more than 1,000,000, there is a possibility of having a problem like a difficulty in controlling an application amount due to high elasticity.

Examples of the alkyl (meth)acrylic ester include methyl (meth)acrylate, butyl (meth)acrylate, and octyl (meth)acrylate having an alkyl group with the carbon atom number of 1 to 12. More specifically, examples of the methacrylate-based component include methyl methacrylate, ethyl methacrylate, n-propyl methacrylate, isopropyl methacrylate, n-hexyl methacrylate, cyclohexyl methacrylate, 2-ethylhexyl methacrylate, n-octyl methacrylate, isooctyl methacrylate, and lauryl methacrylate, and examples of the acrylate component include methyl acrylate, ethyl acrylate, propyl acrylate, butyl acrylate, n-hexyl acrylate, 2-ethylhexyl acrylate, n-octyl acrylate, and lauryl acrylate. They may be used either singly or as a mixture of two or more kinds thereof.

Furthermore, a (meth)acrylate-based monomer, which has, as a functional group, a carboxyl group and/or a hydroxyl group, can be also used in combination. Examples of the monomer having a functional group include (meth) acrylic acid, maleic acid, itaconic acid, crotonic acid, or the like which have a carboxyl group, and acrylic acid-2-hydroxyethyl ester, acrylic acid-2-hydroxypropyl ester, and 2-hydroxyvinyl ether having a hydroxyl group. They can be used, together with the aforementioned acrylate-based component and/or methacrylate-based component, either singly or as a mixture of two or more kinds thereof.

A cross-linking agent may be blended in the adhesive. The blending amount is, relative to 100 parts by mass of the adhesive, generally 0.01 to 10 parts by mass. Examples of the cross-linking agent include an isocyanate compound, aluminum chelate, an aziridinyl-based compound, and an epoxy-based compound.

Furthermore, because the adhesive component used in the adhesive layer 100 preferably has an anti-static property from the viewpoint of having less adhesion of dust and dirt, it may be added with an anti-static agent. With regard to the anti-static agent, when the anti-static performance is a value of surface resistivity of a cleaning jig based on ASTM D257 Standard Test Methods for Dc Resistance or Conductance of Insulating Materials (applied voltage of 500 V, temperature of 23° C., and humidity of 50%) and is the performance of less than $1 \times 10^{10}$ Ω/sq, it can be determined to have an anti-static property. When the performance is equal to or greater than $1 \times 10^{10}$ Ω/sq, it can be determined to have no anti-static property.

Examples of the anti-static agent include, other than a fluorine-based conductive material like potassium nonafluorobutane sulfonate, potassium heptafluoropropane sulfonate, potassium pentafluoroethane sulfonate, potassium trifluoromethane sulfonate, and potassium bis(fluorosulfonyl)imide, a π electron conjugation-system conductive polymer having a repeating unit of aniline and/or a derivative thereof, pyrrole and/or a derivative thereof, isothianaphthene and/or a derivative thereof, acetylene and/or a derivative thereof, an alkylamine derivative, an alkylamide derivative, a monoglyceride derivative, or thiophene and/or a derivative thereof, glycerin fatty acid ester, polyglycerin fatty acid ester, sorbitan fatty acid ester, fine particle of a metal like aluminum, titanium, tin, gold, silver, or copper, ultra-fine particle like carbon, ITO (indium oxide/tin oxide), and ATO (antimony oxide/tin oxide), lithium salt like lithium imide and lithium triflate, and also ethylene oxide adduct, a cationic additive like amine salt type or quaternary ammonium type, and polyethylene oxide-based and polyether-based block polymer. However, the anti-static agent which can be used for the adhesive according to the present invention is not limited to them. Furthermore, the fine particle may be surface-treated in advance.

Among the above, as a material which is preferable in terms of the re-peeling property of the adhesive layer 100, showing no adhesive residue on an end surface of the guide pin GP or the ferrule FR upon peeling of the adhesive, and showing no peeling or an occurrence of foams during an enforced aging test under high temperature and high humidity conditions (i.e., cleaner is tested under an environment of 80° C., atmospheric humidity for 1000 hours and 60° C., 95 RH % for 1000 hours), a heat cycle test (i.e., cleaner is tested under an environment with 100 cycles of −40° C. for 10 min to 80° C. for 10 min at 1° C./min) or the like, a fluorine-based conductive material and a lithium imide are preferable. The blending amount is, relative to 100 parts by mass of the adhesive, 0.1 part by mass or more. It is preferably 0.1 to 20 parts by mass and more preferably 1 to 5 parts by mass. Furthermore, the atmospheric humidity is as described in JIS Z8703, and specifically, it is 45 to 85 RH %.

Furthermore, if necessary, an additive like a colorant, an anti-ultraviolet agent, an anti-aging agent, and the like may be added other than those described above.

Examples of the anti-ultraviolet agent include a benzophenone-based agent like 2-hydroxy-4-octoxybenzophenone, and 2-hydroxy-4-methoxy-5-sulfophenone, a benzotriazole-based agent like 2-(2'-hydroxy-5-methylphenyl) benzotriazole, and a hindered amine-based agent like phenyl salicylate and p-t-butylphenyl salicylate. Examples of the anti-aging agent include an amine-based agent, a phenol-based agent, a bisphenyl-based agent, and a hindered amine-based agent, and there is di-t-butyl-p-cresol, bis(2,2,6,6-tetramethyl-4-piperazyl)sebacate, or the like, for example.

Characteristics

The adhesive layer 100 can undergo at least compressive deformation, elongation deformation, and shear deformation by elastic deformation. Specifics of the compressive deformation, elongation deformation, and shear deformation caused by elastic deformation will be described later.

Movement of Adhesive Layer 100

FIGS. 2A to 3C are cross-sectional views illustrating the movement of the adhesive layer 100 when the guide pin GP is brought into contact with the adhesive layer 100.

Approach State

Figure 2A:
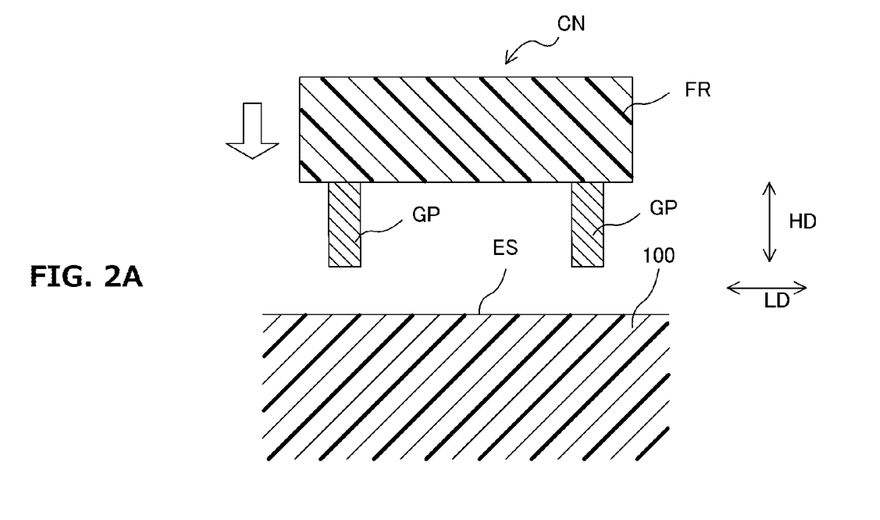
FIG. 2A is a cross-sectional view illustrating a state in which a guide pin GP approaches toward the adhesive layer 100 and the guide pin GP still remains separated from the adhesive layer 100 so that the guide pin GP is not in contact with the adhesive layer 100.

FIG. 2A illustrates a state in which the guide pin GP approaches toward the adhesive layer 100. It is a cross-sectional view illustrating a state in which, as the guide pin GP still remains separated from the adhesive layer 100, the guide pin GP is not in contact with the adhesive layer 100.

As illustrated in FIG. 2A, the connector CN and the adhesive layer 100 are brought close to each other while maintaining a state in which tips of the two guide pins GP face the exposed surface ES (i.e., the top surface part 120) of the adhesive layer 100. Furthermore, it is also possible to move the connector CN to get close to the adhesive layer 100, or to move the adhesive layer 100 to get close to the connector CN.

Shallow Compression State

Figure 2B:
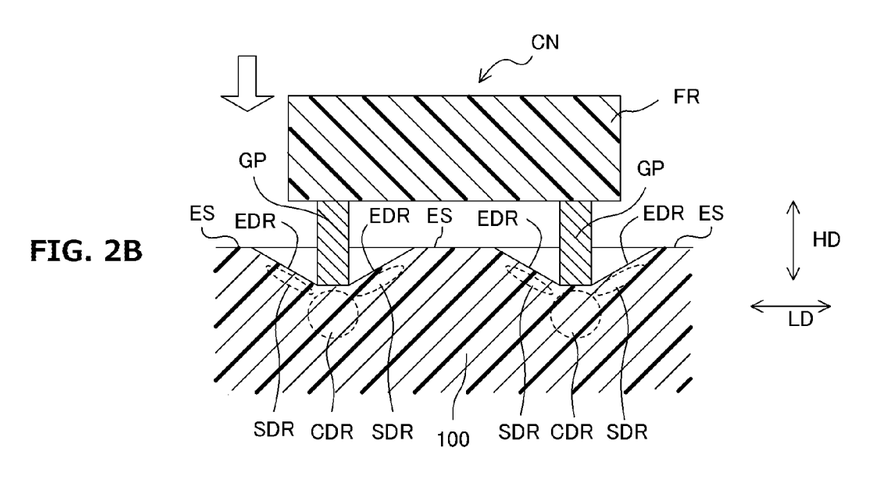
FIG. 2B is a cross-sectional view illustrating a state in which the guide pin GP is pressed to shallow depth of the adhesive layer 100 so that part of an area near the surface of the adhesive layer 100 is deformed by the guide pin GP.

FIG. 2B is a cross-sectional view illustrating a state in which the guide pin GP is pressed to shallow depth of the adhesive layer 100 so that part of an area near the exposed surface ES of the adhesive layer 100 is deformed by the guide pin GP.

As illustrated in FIG. 2B, in accordance with press by the guide pin GP, part of an area near the exposed surface ES of the adhesive layer 100 undergoes elastic deformation. In accordance with the press by the guide pin GP, compressive deformation region CDR showing compressive deformation, elongation deformation region EDR showing elongation deformation, and shear deformation region SDR showing shear deformation are formed. The compressive deformation region CDR is mainly formed in a region below the guide pin GP. The elongation deformation region EDR is mainly formed on the exposed surface ES of the adhesive layer 100 and also near the exposed surface ES. Furthermore, the shear deformation region SDR is mainly formed in an internal region of the adhesive layer 100 rather than on the surface thereof. The shear deformation region SDR is easily formed between the compressive deformation region CDR and the elongation deformation region EDR, and it is formed to have a match between the compressive deformation and elongation deformation.

Deep Compression State

Figure 3A:
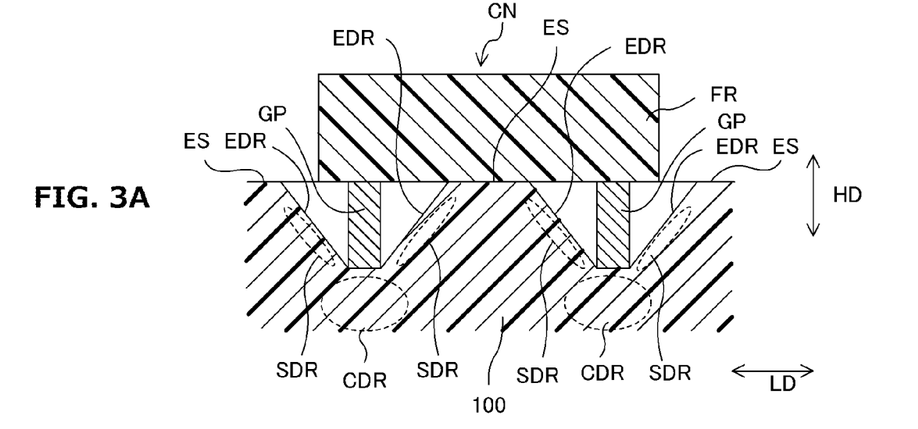
FIG. 3A is a cross-sectional view illustrating a state in which the guide pin GP is further pressed and an exposed surface ES of the adhesive layer 100 is in contact with part of the surface of a ferrule FR of the connector CN.

FIG. 3A is a cross-sectional view illustrating a state in which the guide pin GP is further pressed and the exposed surface ES of the adhesive layer 100 is in contact with the surface of the ferrule FR of the connector CN.

The state illustrated in FIG. 3A represents a state in which, as the guide pin GP is pressed to the greatest depth, the exposed surface ES of the adhesive layer 100 is in contact with part of the surface of the ferrule FR of the connector CN. The adhesive layer 100 has the largest elastic deformation, yielding a state in which the compressive deformation region CDR, the elongation deformation region EDR, and the shear deformation region SDR have the broadest area. As the adhesive layer 100 has the compressive deformation, elongation deformation, and shear deformation, deformation occurs in the adhesive layer 100. To resolve the deformation occurred due to the elastic deformation of the adhesive layer 100, restorative force toward the exposed surface ES is generated in the adhesive layer 100.

Resolve State

Figure 3B:
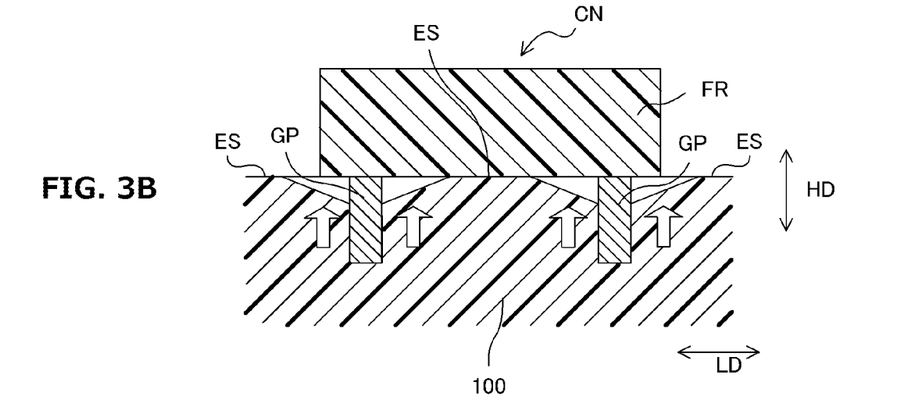
FIG. 3B is a cross-sectional view illustrating a state in which slow recovery from compressive deformation occurs due to restorative force generated in the adhesive layer 100.

FIG. 3B is a cross-sectional view illustrating a state in which slow recovery occurs due to restorative force generated in the adhesive layer 100.

Due to the restorative force generated in the adhesive layer 100, the adhesive layer 100 undergoes over time, while deforming to slowly cover the surface of the guide pin GP, deformation toward the surface of the ferrule FR so as to approach the shape before press by the guide pin GP. The compressive deformation, elongation deformation, and shear deformation that are formed in the adhesive layer 100 are gradually resolved over time in accordance with the deformation of the adhesive layer 100. Like that, according to resolving of the compressive deformation, elongation deformation, and shear deformation occurred in the adhesive layer 100, the adhesive layer 100 can deform to follow the shape of the guide pin GP.

State of Close Contact

Figure 3C:
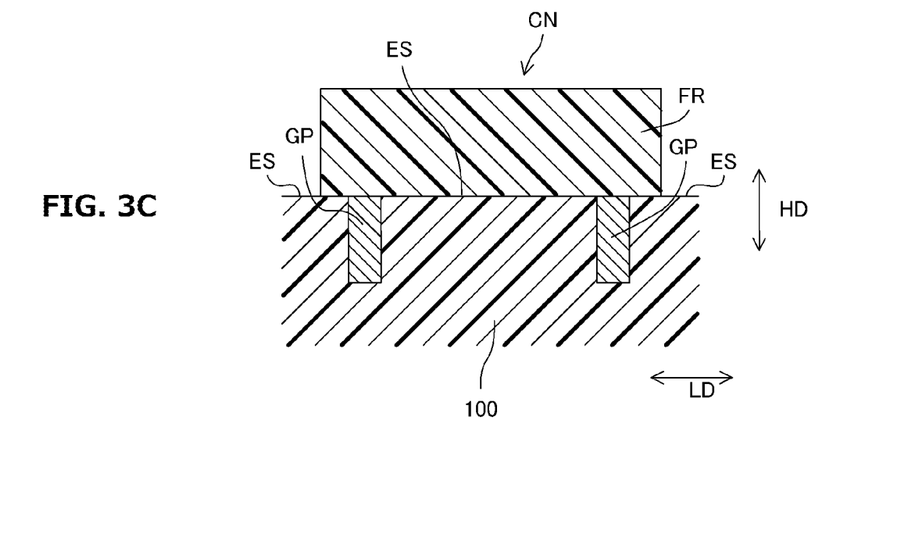
FIG. 3C is a cross-sectional view illustrating a state in which the adhesive layer 100 is deformed by the restorative force generated in the adhesive layer 100 and the adhesive layer 100 is in close contact with the surface of the guide pin GP and the surface of the ferrule FR.

FIG. 3C is a cross-sectional view illustrating a state in which the adhesive layer 100 is deformed by the restorative force generated in the adhesive layer 100 and the adhesive layer 100 is in close contact with the surface of the guide pin GP and the surface of the ferrule FR.

As illustrated in FIG. 3C, in accordance with the deformation of the exposed surface ES of the adhesive layer 100, the exposed surface ES is brought into close contact with the surface of the guide pin GP and the surface of the ferrule FR. Namely, a state in which the surface of the guide pin GP and the surface of the ferrule FR are covered by the exposed surface ES of the adhesive layer 100 is yielded. The exposed surface ES of the adhesive layer 100 can have sufficient elongation deformation and it can be in close contact with a root part of the guide pin GP.

Furthermore, according to the present embodiment, there is no case of having breakage of the exposed surface ES even when the guide pin GP is pressed-in by compression into the adhesive layer 100. As such, the guide pin GP never enters the inside of the adhesive layer 100 according to breakage of the exposed surface ES. As described in the above, according to the elongation deformation, the exposed surface ES covers the surface of the guide pin GP. Accordingly, as the adhesive layer 100 never has breakage due to press by the guide pin GP and no broken piece of the adhesive layer 100 is yielded, so-called adhesive residue can be prevented.

Process of Deformation of Adhesive Layer 100

As described in the above, the adhesive layer 100 first undergoes elastic deformation in accordance with press by the guide pin GP (FIG. 2B and FIG. 3A). This elastic deformation includes compressive deformation, elongation deformation, and shear deformation. In accordance with those deformations, deformation occurs in the adhesive layer 100, yielding a state in which elastic energy is accumulated. As a result of the accumulation of elastic energy, the adhesive layer 100 is in a state in which restorative force is generated. Due to this restorative force, the adhesive layer 100 is deformed, while resolving the deformations, such that it can be in close contact with the surface of the guide pin GP and the surface of the ferrule FR (FIG. 3B). Accordingly, in a state in which the guide pin GP is pressed to the adhesive layer 100, the deformations generated in the adhesive layer 100 are maximally resolved to yield a stable state (FIG. 3C).

Thus, it is preferable for the adhesive layer 100 to easily have compressive displacement, elongation deformation, and shear deformation in accordance with application of stress caused by press by the guide pin GP or the like and also easily have an occurrence of restorative force for returning to the original shape by resolving the compressive displacement, elongation deformation, and shear deformation as a result of resolving deformation caused by those deformations. In particular, it is preferable for a surface such as the top surface part 120 (exposed surface ES) of the adhesive layer 100 to have sufficient elongation and shrinking.

Relationship Between Length GL Pressed by Guide Pin GP and Deformation Radius R

Figure 4A:
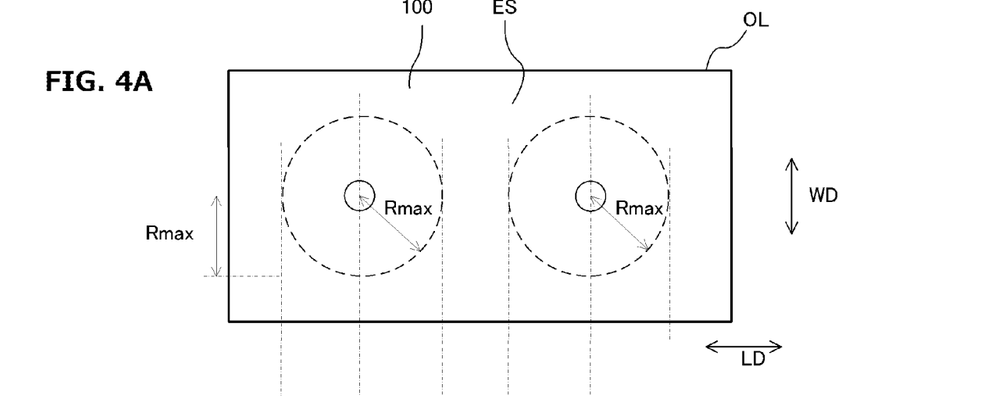
FIG. 4A is a plan view illustrating the maximum deformation range.
Figure 4B:
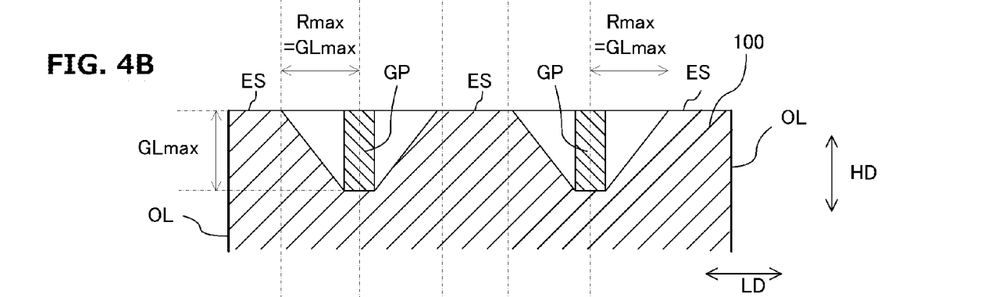
FIG. 4B is a cross-sectional view illustrating the maximum deformation depth.

FIG. 4A and FIG. 4B illustrate the same state as FIG. 3B, and they are schematic diagrams illustrating a state in which the adhesive layer 100 has been deformed to the largest extent according to press by the guide pin GP. FIG. 4A is a plan view illustrating the maximum deformation range and FIG. 4B is a cross-sectional view illustrating the maximum deformation depth. FIG. 4A and FIG. 4B illustrate a state in which the exposed surface ES of the adhesive layer 100 is in contact with the end surface of the ferrule FR (not illustrated) of the connector CN.

The adhesive layer 100 consists of a material which shows isotropic displacement against applied stress. Unless a material showing anisotropic displacement against applied stress is specifically selected, isotropic displacement is exhibited against stress. Because the adhesive layer 100 shows isotropic displacement, deformation occurs in a concentric manner by having a site pressed by the guide pin GP at the center. It is also considered that, from the aspect of having isotropic displacement, the adhesive layer 100 is deformed at the same level as the depth pressed by the guide pin GP.

The depth pressed by the guide pin GP is referred to as GL and, by having a site pressed by the guide pin GP at the center, radius of a range influenced by the deformation is referred to as R. Furthermore, in the present embodiment, the range influenced by the deformation is defined for a surface like the top surface part 120 (exposed surface ES) of the adhesive layer 100 or the like. As described in the above, since the influence of the deformation is exhibited at the same level as the depth pressed by the guide pin GP, the relationship of (Radius R of range influenced by deformation)=(Pressed length GL) is established.

As described in the above, the state illustrated in FIG. 4A and FIG. 4B represents a state in which the adhesive layer 100 has deformed to the largest extent. It is a state in which the guide pin GP is pressed to the greatest depth and the relationship of (Pressed length GL)=(Length GLmax of guide pin GP) is established (see, FIG. 4B). Furthermore, in this state, the relationship of (Radius R of range influenced by deformation)=(Radius Rmax of range influenced by deformation in the state of having largest deformation) is established (see, FIG. 4A). Also in this state, the relationship of (Radius R of range influenced by deformation)=(Pressed length GL) is established, and specifically, the relationship of (Radius Rmax of range influenced by deformation in the state of having largest deformation)=(Length GLmax of guide pin GP) is established (see, FIG. 4B). Namely, when the guide pin GP is pressed to GLmax, deformation of the adhesive layer 100 occurs over a range from a site pressed by the guide pin GP at the center to the radius GLmax.

As described above, according to press by the guide pin GP, the adhesive layer 100 deforms over a range from a site pressed by the guide pin GP at the center to the radius GLmax. Thus, when the adhesive layer 100 is present alone (i.e., holding body for holding the adhesive layer 100 is not present), the adhesive layer 100 deforms over a range from a site pressed by the guide pin GP at the center to the radius Rmax so as to store the deformation required for resolving. After that, according to resolving of the deformation, the adhesive layer 100 can deform until it has close contact with the surface of the guide pin GP and the surface of the ferrule FR.

Relationship Between Holding Body for Holding Adhesive Layer 100 and Deformation Range of Adhesive Layer 100

Because the adhesive layer 100 has adhesive force and easily adheres to various members, handling is difficult when it is used alone, and thus it is considered to be used with a holding body for holding the adhesive layer 100 (see, FIG. 5 to FIG. 7, for example, described below).

As described in the above, the relationship of (Radius Rmax of range influenced by deformation in the state of having largest deformation)=(Length GLmax of guide pin GP) is established and the adhesive layer 100 deforms to GLmax at maximum. Based on that, even for a case in which a holding body for holding the adhesive layer 100 is present, the holding body is disposed to a position which is separated at least by GLmax from a site pressed by the guide pin GP. Namely, the distance of at least GLmax from the site pressed by the guide pin GP needs to be secured (see, outer peripheral line OL of FIG. 4A and FIG. 4B). By doing so, similar to a case in which a holding body for holding the adhesive layer 100 is not present, deformation required for resolving can be stored. After that, according to resolving of the deformation, the adhesive layer 100 can deform until it has close contact with the surface of the guide pin GP and the surface of the ferrule FR can be achieved.

As described above, by disposing a holding body at a position which is sufficiently apart from a site pressed by the guide pin GP, the adhesive layer 100 can be sufficiently deformed without interruption of the holding body and deformation required for resolving can be stored, and thus causing an occurrence of restorative force in the adhesive layer 100 and having close contact of the adhesive layer 100 to a root part of the guide pin GP. Furthermore, because the adhesive layer 100 can be deformed without interruption of the holding body, breakage of the adhesive layer 100 near the holding body can be prevented without having an occurrence of high stress between the holding body and the adhesive layer 100.

Specific Examples of Cleaner

Figure 4C:
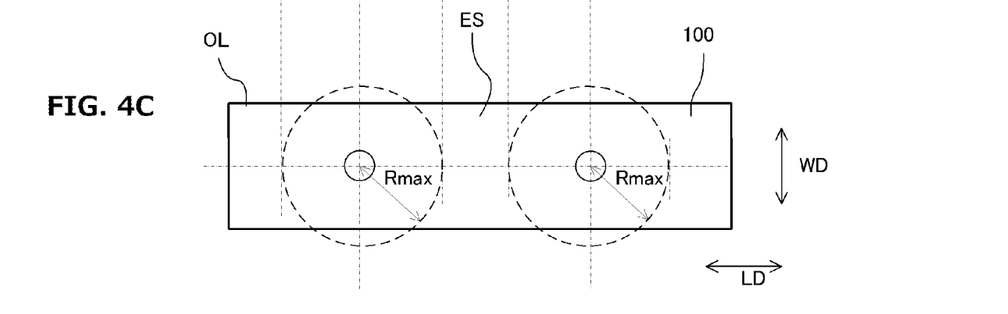
FIG. 4C is a plan view illustrating a case in which GLmax cannot be secured from a site pressed by the guide pin GP.

Hereinbelow, specific examples of a cleaner having a holding body for holding the adhesive layer 100 are described. As described in the above, it is preferable that the holding body is disposed to a position which is sufficiently apart from a site pressed by the guide pin GP. However, a case in which the size or shape of the holding body is limited in view of the shape of a connector or the like is also considered. For example, as illustrated in FIG. 4C, a case in which the distance of at least GLmax from a site pressed by the guide pin GP cannot be secured is also considered (see, outer peripheral line OL of FIG. 4C). Even for this case, it is preferable to have a holding body which can store deformation required for resolving. Specific examples of a cleaner having a holding body are described hereinbelow.

By introducing an adhesive to a holding body 200 of a cleaner 10, a holding body 300 of a cleaner 20, and a holding body 400 of a cleaner 30, or to a mold including these holding bodies followed by hardening, the cleaners 10, 20 and 30 to be described later are integrally formed with the adhesive layer 100. Alternatively, it is also possible that these holding bodies and the adhesive layer 100 are formed individually, and finally integrated as a cleaner.

Cleaner 10

Figure 5:
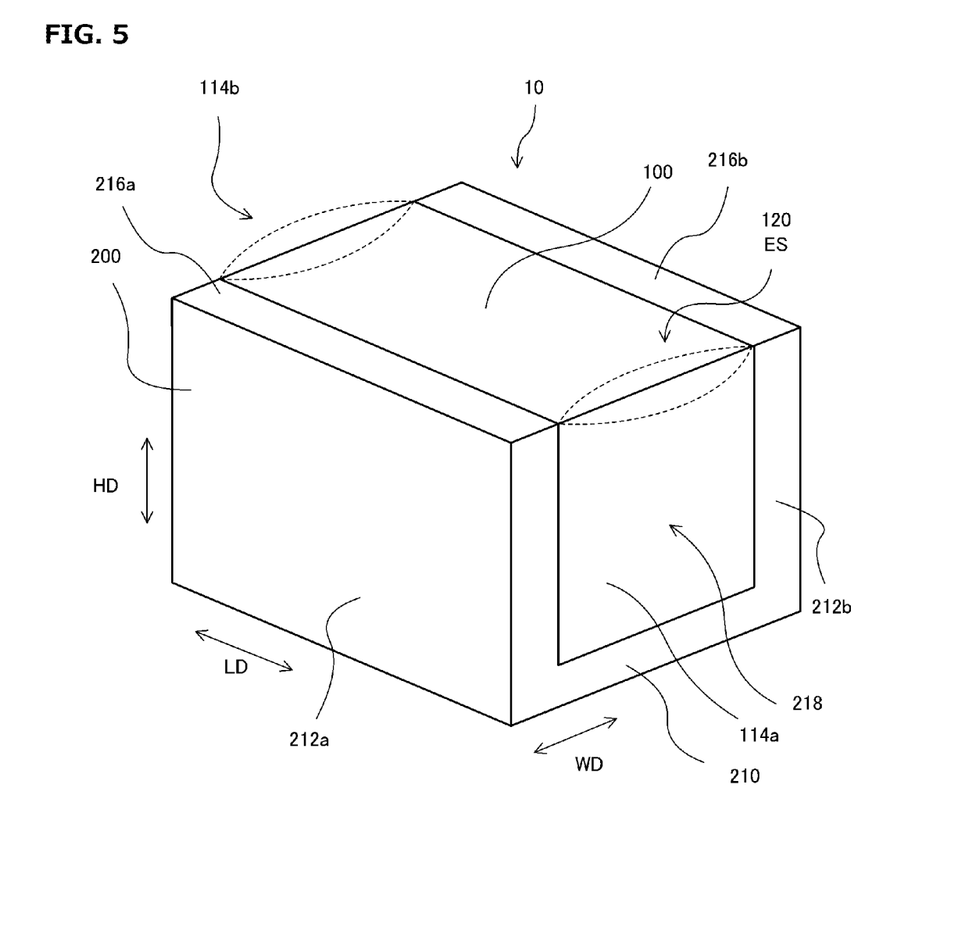
FIG. 5 is a perspective view illustrating the external appearance of a cleaner 10.

FIG. 5 is a perspective view illustrating the external appearance of the cleaner 10. The cleaner 10 has the adhesive layer 100 described in the above and the holding body 200.

Holding Body 200

The holding body 200 holds the adhesive layer 100 at a constant position. The holding body 200 is formed of a material which is harder than the adhesive layer 100. The holding body 200 is preferably formed of a material which can stably hold the adhesive layer 100. As for the material, any resin usable as a material for resin molding can be used other than an acrylic resin, polybutylene terephthalate (PBT), and polyethylene terephthalate (PET), for example.

When an acrylic resin is used as a material for forming the holding body 200, an acrylic ester-based or methacrylic ester-based homopolymer or copolymer can be mentioned. The copolymer may be either a random copolymer or a block copolymer.

Examples of the acrylic ester monomer which is suitable for use for them include, from the viewpoint of enhancing the fluidity during heat melting, anti-thermal degradation property, and compatibility with other addition components, other than an acrylic alkyl ester like methyl acrylate, ethyl acrylate, n-propyl acrylate, isopropyl acrylate, n-butyl acrylate, isobutyl acrylate, tert-butyl acrylate, hexyl acrylate, 2-ethylhexyl acrylate, nonyl acrylate, decyl acrylate, dodecyl acrylate, and stearyl acrylate, a hydroxyl group-containing acrylic alkyl ester like 2-hydroxyethyl acrylate, 2-hydroxypropyl acrylate, and 4-hydroxybutyl acrylate, cyclohexyl acrylate, 2-methoxyethyl acrylate, 3-methoxybutyl acrylate, trifluoromethyl acrylate, trifluoroethyl acrylate, pentafluoroethyl acrylate, glycidyl acrylate, allyl acrylate, phenyl acrylate, toluyl acrylate, benzyl acrylate, isobornyl acrylate, 3-dimethylaminoethyl acrylate, and the like.

Among the above acrylic ester-based monomers, an acrylic alkyl ester is preferable, and an acrylic alkyl ester in which the alkyl group of ester moiety has the carbon atom number of 1 to 4 is more preferable.

Examples of the suitable methacrylic ester monomer include, similarly from the viewpoint of enhancing the fluidity during heat melting, anti-thermal degradation property, and compatibility with other addition components, a methacrylic alkyl ester in which the alkyl group of ester moiety has the carbon atom number of 1 to 18 like methyl methacrylate, ethyl methacrylate, isopropyl methacrylate, n-butyl methacrylate, isobutyl methacrylate, tert-butyl methacrylate, pentyl methacrylate, hexyl methacrylate, heptyl methacrylate, 2-ethylhexyl methacrylate, nonyl methacrylate, decyl methacrylate, dodecyl methacrylate, tridecyl methacrylate, and stearyl methacrylate, cyclohexyl methacrylate, phenyl methacrylate, and the like.

Among the above methacrylic esters, from the viewpoint of easy obtainability, methyl methacrylate, ethyl methacrylate, n-butyl methacrylate, isobutyl methacrylate, tert-butyl methacrylate, 2-ethylhexyl methacrylate, dodecyl methacrylate, isobornyl methacrylate, cyclohexyl methacrylate, tridecyl methacrylate and stearyl methacrylate are preferable. Furthermore, a methacrylic alkyl ester in which the carbon atom number of the alkyl group of ester moiety is 1 to 4 is more preferable, and methyl methacrylate is even more preferable.

Furthermore, other polymer may be included in the acrylic ester or methacrylic ester polymer within a range in which the purpose of the present invention is not inhibited.

Examples of another copolymer monomer described above include unsaturated monocarboxylic acid such as methacrylic acid or acrylic acid, a vinyl cyanide compound such as acrylonitrile or methacrylonitrile, an aromatic vinyl compound such as a styrene, α-methylstyrene, p-methylstyrene, p-methoxystyrene, divinylbenzene, or vinyl naphthalene, an unsaturated dicarboxylic acid compound such as a maleic anhydride, maleic acid, maleic acid monoester, maleic acid diester, fumaric acid, fumaric acid monoester, or fumaric acid diester or a derivative thereof, a maleimide compound such as maleimide, methyl maleimide, ethyl maleimide, propyl maleimide, butyl maleimide, hexyl maleimide, octyl maleimide, dodecyl maleimide, stearyl maleimide, phenyl maleimide, cyclohexyl maleimide or the like, a conjugated diene compound such as a butadiene or isoprene, a halogen-containing unsaturated compound such as a vinyl chloride, vinylidene chloride, tetrafluoroethylene, hexafluoropropylene, vinylidene fluoride, or chloroprene, a silicon-containing unsaturated compound such as a vinyltrimethoxysilane or vinyltriethoxysilane, and the like. These monomers may be used either singly or used by mixing two or more kinds thereof.

A method for polymerizing the above monomers is not particularly limited, and examples of the method include a suspension polymerization method, a bulk polymerization method, and a solution polymerization method.

In addition, an anti-static agent can be added to the resin material constituting the holding body 200, and a rubber component may be used in combination in order to impart shock resistance, or modifiers such as an aromatic dicarboxylic acid ester, an aliphatic dicarboxylic acid ester, or a phosphoric acid ester may be introduced in order to improve heat resistance.

The holding body 200 has a shape of a near concave groove. The holding body 200 has a bottom part 210, a side wall part 212a, and a side wall part 212b. The side wall part 212a and the side wall part 212b are disposed on the bottom part 210 such that they have the bottom part 210 inserted between them and they are away from the bottom part 210 in a substantially perpendicular direction. The shape having a substantially concave groove is defined by the bottom part 210, the side wall part 212a, and the side wall part 212b.

The bottom part 210 has an almost rectangular shape, and can be in close contact with the bottom surface part 110 of the adhesive layer 100. The side wall part 212a and the side wall part 212b are formed in a substantially parallel manner while facing each other, and they have an almost rectangular shape. The side wall part 212a can be in close contact with the side surface part 112a of the adhesive layer 100. The side wall part 212b can be in close contact with the side surface part 112b of the adhesive layer 100.

Due to the adhesive force of the adhesive layer 100, the bottom part 210 is in close contact with the bottom surface part 110, the side wall part 212a is in close contact with the side surface part 112a, and the side wall part 212b is in close contact with the side surface part 112b. As a result, the holding body 200 can stably hold the adhesive layer 100. In a case in which the adhesive layer 100 is disposed or formed on the holding body 200, the top surface part 120 becomes the exposed surface ES.

On the top end of the side wall part 212a, a top end part 216a is formed while a top end part 216b is formed on the top end of the side wall part 212b. The height H of the adhesive layer is the same as the height of the side wall parts 212a and 212b, and the top end parts 216a and 216b are approximately on the same plane as the top surface part 120 (exposed surface ES) of the adhesive layer 100. Namely, there is no step between the top end parts 216a and 216b and the top surface part 120 of the adhesive layer 100, thus forming a same flat surface. Furthermore, as described in the above, it is not necessarily required for the top surface part 120 to be flat, and it is sufficient that the area between the top end parts 216a and 216b and the top surface part 120 is close to an approximately same flat surface.

Function Related to Width Direction WD

In the holding body 200, the side wall part 212a and the side wall part 212b facing each other are formed at different positions along the width direction WD, and the adhesive layer 100 is held by the side wall part 212a and the side wall part 212b. Furthermore, in a case in which the adhesive layer 100 can be pressed with intermediation by the side wall part 212a and the side wall part 212b, the adhesive layer 100 may be held with elastically deformed to a certain degree. By having elastic deformation of the adhesive layer 100, restorative force is generated in the adhesive layer 100 so that the adhesive layer 100 can be more stably held while being in close contact with the side wall part 212a and the side wall part 212b.

Function Related to Length Direction LD

Furthermore, no side wall is formed in the length direction LD of the holding body 200. Namely, the side part 218 in the length direction LD of the holding body 200 is open, and, when the adhesive layer 100 is deformed, easiness or degree of freedom can be ensured for the deformation of the adhesive layer 100 in the length direction LD. In other words, depending on an aspect of the deformation of the adhesive layer 100, it is possible to have deformation such that the side surface parts 114a and 114b of the adhesive layer 100 bulge (i.e., protrude) from the outer contour of the holding body 200 or shrink (contract) (see, broken line of FIG. 5). Accordingly, in the case of having deformation in part of the adhesive layer 100, the deformation can be obtained, depending on the degree or aspect of the deformation, with easy displacement of the adhesive layer 100 over the entire adhesive layer 100 and absorption of the partial deformation over the entire adhesive layer 100.

Accordingly, by increasing the easiness or degree of freedom of the deformation of the adhesive layer 100 in the length direction LD, at the time of having deformation of the adhesive layer 100, it is easy to deform the adhesive layer 100 until it reaches the surface of the ferrule FR, the guide pin GP, or a root part of the guide pin GP. Namely, even in a case in which the adhesive layer 100 is held by the holding body 200, by ensuring the easiness for deforming the adhesive layer 100 without any impairment, the adhesive layer 100 can be brought into close contact with the surface of the ferrule FR, the guide pin GP, or a root part of the guide pin GP. In particular, even in a case in which the length GLmax of the guide pin GP cannot be obtained from a site pressed by the guide pin GP, deformation required for resolving can be stored. Due to this reason, dust and dirt present on the surface of the ferrule FR, the guide pin GP, or a root part of the guide pin GP are transferred and attached onto the adhesive layer 100 due to adhesive force, and thus the clean property can be certainly obtained.

The cleaner 10 is constituted such that, other than the top surface part 120, side surface parts 114a and 114b are exposed from the holding body 200. Namely, as the cleaner 10 is constituted such that, other than the top surface part 120, at least one side surface is exposed from the holding body 200, easiness for having deformation of the adhesive layer 100 is certainly obtained.

According to the holding body 200 of the cleaner 10, no side wall is formed at all in the side part 218 in the length direction LD. As it is described in the above, it is sufficient to have, at the time of having deformation of the adhesive layer 100, easy displacement of the adhesive layer 100 over the entire adhesive layer 100 depending on the degree or aspect of the deformation. As such, it is also possible to form a side wall part having a gap, a penetrating hole, or the like (not illustrated) at the side part 218 in the length direction LD. By disposing a gap, a penetrating hole, or the like on the top part of the side part 218 or the like, the adhesive layer 100 can be easily deformed until it reaches the surface of the ferrule FR, the guide pin GP, or a root part of the guide pin GP.

Cleaner 20

Figure 6:
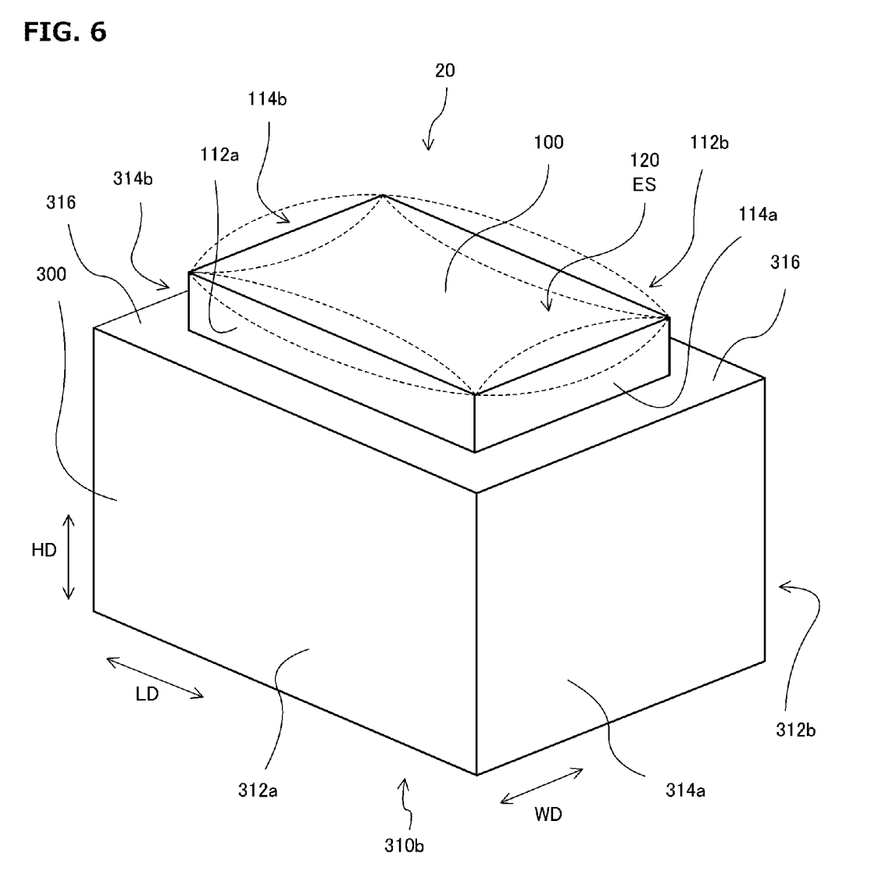
FIG. 6 is a perspective view illustrating the external appearance of a cleaner 20.

FIG. 6 is a perspective view illustrating the external appearance of cleaner 20. The cleaner 20 has the adhesive layer 100 described in the above and the holding body 300.

Holding Body 300

The holding body 300 holds the adhesive layer 100 at a constant position. Similar to the holding body 200, the holding body 300 is formed of a material which is harder than the adhesive layer 100. The holding body 300 is preferably formed of a material which can stably hold the adhesive layer 100.

The holding body 300 has a near-bath shape. The holding body 300 has a bottom part 310, a side wall part 312a, a side wall part 312b, a side wall part 314a, and a side wall part 314b. The side wall part 312a and the side wall part 312b are disposed on the bottom part 310 such that they have the bottom part 310 inserted between them and they are away from the bottom part 310 in a substantially perpendicular direction. The side wall part 314a and the side wall part 314b are disposed on the bottom part 310 such that they have the bottom part 310 inserted between them and they are away from the bottom part 310 in a substantially perpendicular direction. The near-bath shape is defined by the bottom part 310, the side wall part 312a, the side wall part 312b, the side wall part 314a, and the side wall part 314b.

The bottom part 310 has an almost rectangular shape, and can be in close contact with the bottom surface part 110 of the adhesive layer 100. The side wall part 312a and the side wall part 312b are formed in a substantially parallel manner while facing each other, and they have an almost rectangular shape. The side wall part 312a can be in close contact with the side surface part 112a of the adhesive layer 100. The side wall part 312b can be in close contact with the side surface part 112b of the adhesive layer 100. The side wall part 314a and the side wall part 314b are formed in a substantially parallel manner while facing each other, and have an almost rectangular shape. The side wall part 314a can be in close contact with the side surface part 114a of the adhesive layer 100. The side wall part 314b can be in close contact with the side surface part 114b of the adhesive layer 100.

Due to the adhesive force of the adhesive layer 100, the bottom part 310 is in close contact with the bottom surface part 110, the side wall part 312a is in close contact with the side surface part 112a, the side wall part 312b is in close contact with the side surface part 112b, the side wall part 314a is in close contact with the side surface part 114a, and the side wall part 314b is in close contact with the side surface part 114b. As a result, the holding body 300 can stably hold the adhesive layer 100. In a case in which the adhesive layer 100 is disposed or formed on the holding body 300, the top surface part 120 becomes the exposed surface ES.

On the top end of the side wall part 312a, the side wall part 312b, the side wall part 314a, and the side wall part 314b, a top end part 316 is formed. The height of the side wall part 312a, the side wall part 312b, the side wall part 314a, and the side wall part 314b is shorter than the height H of the adhesive layer. Due to this reason, the top surface part 120 (exposed surface ES) of the adhesive layer 100, the top part of the side surface part 112a, the top part of the side surface part 112b, the top part of the side surface part 114a, and the top part of the side surface part 114b are exposed from the top end part 316 of the holding body 300. Namely, the adhesive layer 100 is disposed such that part thereof protrudes from the holding body 300.

Function Caused by Protrusion of Adhesive Layer 100 from Holding Body 300

As described in the above, the top surface part 120 of the adhesive layer 100, the top part of the side surface part 112a, the top part of the side surface part 112b, the top part of the side surface part 114a, and the top part of the side surface part 114b are exposed from top end part 316 of the holding body 300. In other words, on the top side of the side wall part 312a, the side wall part 312b, the side wall part 314a, and the side wall part 314b of the holding body 300, a side wall is not formed in any one of the length direction LD and the width direction WD. Namely, the top sides of the side wall part 312a, the side wall part 312b, the side wall part 314a, and the side wall part 314b are open in the length direction LD and the width direction WD, and thus easiness or degree of freedom of deformation of the adhesive layer 100 in the length direction LD and the width direction WD can be certainly obtained at the time of having deformation of the adhesive layer 100.

Due to this reason, depending on an aspect of the deformation of the adhesive layer 100, it is possible to have deformation such that the top part of the side surface part 112a, the top part of the side surface part 112b, the top part of the side surface part 114a, and the top part of the side surface part 114b of the adhesive layer 100 bulge (i.e., protrude) from the outer contour of the holding body 300 or shrink (contract) (see, broken line of FIG. 6). Accordingly, in the case of having deformation in part of the adhesive layer 100, the deformation can be obtained, depending on the degree or aspect of the deformation, with easy displacement of the adhesive layer 100 over the entire adhesive layer 100 and absorption of the partial deformation over the entire adhesive layer 100.

By increasing the easiness or degree of freedom of the deformation of the adhesive layer 100 in the length direction LD and the width direction WD, at the time of having deformation of the adhesive layer 100, it is easy to deform the adhesive layer 100 until it reaches the surface of the ferrule FR, the guide pin GP, or a root part of the guide pin GP. Namely, even in a case in which the adhesive layer 100 is held by the holding body 300, by ensuring the easiness for deforming the adhesive layer 100 without any impairment, the adhesive layer 100 can be brought into close contact with the surface of the ferrule FR, the guide pin GP, or a root part of the guide pin GP. In particular, even in a case in which the length GLmax of the guide pin GP cannot be obtained from a site pressed by the guide pin GP, deformation required for resolving can be stored. Due to this reason, dust and dirt present on the surface of the ferrule FR, the guide pin GP, or a root part of the guide pin GP are transferred and attached onto the adhesive layer 100 due to adhesive force, and thus the clean property can be certainly obtained.

The protrusion height of the side surface parts 112a, 112b, 114a, and 114b of the adhesive layer 100 from the top end part 316 of the holding body 300 is preferably ¼ or more of the height of the side wall parts 312a, 312b, 314a, and 314b. The top part of the adhesive layer 100 protruded from the top end part 316 can be easily deformed. Furthermore, the protrusion height of the side surface parts 112a, 112b, 114a, and 114b of the adhesive layer 100 from the top end part 316 of the holding body 300 is preferably half or more of the height of the side wall parts 312a, 312b, 314a, and 314b. The easiness of having deformation of the top part of the adhesive layer 100 protruded from the top end part 316 can be further enhanced.

The cleaner 10 is constituted such that, other than the top surface part 120 (exposed surface ES), the top part of the side surface part 112a, the top part of the side surface part 112b, the top part of the side surface part 114a, and the top part of the side surface part 114b are exposed from the holding body 200. Namely, as the cleaner 10 is constituted such that, other than the top surface part 120 (exposed surface ES), at least one side surface is exposed from the holding body 300, easiness for having deformation of the adhesive layer 100 is certainly obtained.

Cleaner 30

Figure 7:
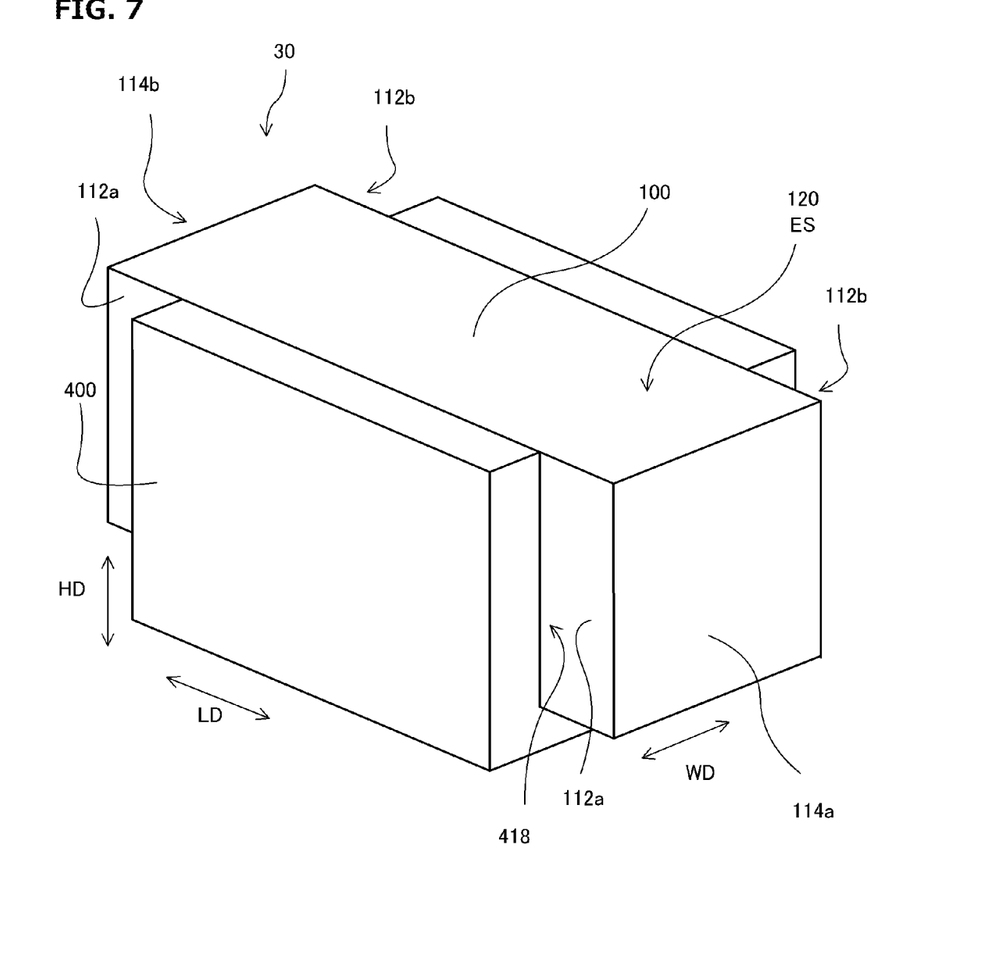
FIG. 7 is a perspective view illustrating the external appearance of a cleaner 30.

FIG. 7 is a perspective view illustrating the external appearance of the cleaner 30. The cleaner 30 has the adhesive layer 100 described in the above and the holding body 400. The holding body 400 is formed so as to be shorter than the length of the holding body 200 of the cleaner 10. In the holding body 400, no side wall is formed in the length direction LD. Namely, a side part 418 in the length direction LD of the holding body 400 is open. Depending on an aspect of the deformation of the adhesive layer 100, it is possible to have deformation such that the side surface parts 114a and 114b of the adhesive layer 100 bulge (i.e., protrude) from the outer contour of the holding body 400 or shrink (contract).

Furthermore, the end parts of the side surface parts 112a and 112b of the adhesive layer 100 also protrude from the outer contour of the holding body 400. By doing so, the easiness or degree of freedom of the deformation of the adhesive layer 100 in the length direction LD and the width direction WD is enhanced. Even in a case in which the length GLmax of the guide pin GP cannot be obtained from a site where the guide pin GP is pressed, deformation required for resolving can be stored. The adhesive layer 100 can be easily deformed until it reaches the surface of the ferrule FR, the guide pin GP, or a root part of the guide pin GP at the time of deforming the adhesive layer 100.

Specific Example of Cleaning Tool Using Cleaners 10, 20 and 30

The aforementioned cleaners 10, 20, and 30 can be applied to both a male type connector and a female type connector. In either case, it is preferable to have the dimensions of the holding bodies 200, 300, and 400 fitted to the shape or size of a connector.

Determination of Dust Removing Property and Adhesive Transfer Property Using Cleaners 10, 20, and 30

The dust removing property and adhesive transfer property were determined by the following method using the cleaners 10, 20, and 30.

Forming of Adhesive Layer

An acrylic adhesive was prepared by adding, to 100 parts by mass of an acrylic adhesive material consisting of an acrylic ester copolymer and a methacrylic ester copolymer as an acrylic adhesive material, 1 part by mass of an epoxy curing agent, and 1.6 parts by mass of lithium bistrifluoromethane sulfonimide as an anti-static agent and followed by mixing with a stirrer. Subsequently, the acrylic adhesive was filled in each holding body (for a holding body having no side wall on four sides, an extra mold was used), and, by carrying out heating for 10 minutes or so in an oven at approximately 80° C., a cleaner having an acrylic adhesive layer formed in each holding body was obtained.

Next, onto an end surface of an MPO connector for optical communication which is provided with the protruded guide pin GP (in FIG. 1, surface on which protruded guide pin GP is provided), Arizona dust sucked in a dropper was sprayed to create a state in which particulate dust adheres. Then, the cleaner was pressed several times against the surface where Arizona dust adheres and the dust removing property and adhesive transfer property (adhesive residue) to a guide pin or the like were determined. This operation was performed for each cleaner. Presence or absence of dust and adhesive residue after cleaning was determined by naked eye observation using a digital microscope at a magnification of 30.

As a result of the above test, it was found that all of the cleaners 10, 20, and 30 of the present invention allow clean removal of Arizona dust and show no adhesive transfer (adhesive residue) to the guide pin GP or surface provided with protruded guide pin GP. Furthermore, the surface of each cleaner after completing the above cleaning test shows restoration to the original shape without having an occurrence of breakage or the like.

Scope of Present Embodiment

As described in the above, the present invention is described in view of the present examples, but it shall not be understood that the present invention is limited by the descriptions and drawings constituting part of this disclosure. It is needless to say that various embodiments or the like not described herein are also included in the present invention.

REFERENCE SIGNS LIST

100 Adhesive Layer
200 Holding Body
212a Side Wall Part
212b Side Wall Part
300 Holding Body
400 Holding Body
GP Guide Pin
CN Connector
ES Exposed Surface

The invention claimed is:

1. A cleaning method with a cleaner for cleaning a connector having a guide pin, wherein the cleaner is configured to comprise:
an adhesive layer having an exposed surface facing an end surface of the connector from which the guide pin protrudes in an axial direction wherein the guide pin has a predetermined pin length (GL) in the axial direction, the adhesive layer being elastically deformable when subjected to contact with the guide pin; and
a holding part that composes a bottom part and a side wall part wherein the adhesive layer sits on the bottom part, and the side wall part extends perpendicular to the bottom part to hold the adhesive layer while exposing at least the exposed surface, the cleaning method, comprising:
pressing the connector into the adhesive layer until the exposed surface of the adhesive layer reaches the end surface of the connector in a manner that the axial direction of the guide pin is oriented perpendicular to the bottom part, a leading tip of the guide pin comes into contact with the exposed surface of the adhesive layer at a contact position and the exposed surface is deformed as the guide pin projects towards the bottom part such that the exposed surface wraps the guide pin, and next
pulling the connector out of the adhesive layer, wherein
a distance measured from a center of the contact position to the side wall part, which is defined in a direction perpendicular to the axial direction of the guide pin, is greater than the pin length of the guide pin,
the adhesive layer is in a cuboid shape, having a length in a length direction (LD), a width in a width direction (WD) and a height in a height direction (HD), each of the length, width and height directions being perpendicular to the other two directions,
the adhesive layer has a first adhesive side surface and a second adhesive side surface that are perpendicular to the exposed surface, facing each other either in the width direction or in the length direction,
the side wall part has a first side wall part and a second side wall part facing each other,
in the holding part, the first adhesive side surface and the first side wall part face each other, the second adhesive side surface and the second side wall part face each other wherein the adhesive layer intervenes between the first side wall part and the second side wall part such that the first and second side wall parts hold the adhesive layer,
the holding part has a recessed portion that is surrounded with the first and second side wall parts and the bottom part, into which the adhesive layer is contained,
the recessed portion has a depth in the height direction and either the depth of the recessed portion or the height of the adhesive layer is greater than the pin length of the guide pin,
each of the first and second side wall parts has a tip portion facing toward the end surface of the connector, and
the exposed surface of the adhesive layer is protruded beyond the tip portions while the adhesive layer is contained in the recessed portion.

2. A cleaner comprising:
an adhesive layer having an exposed surface facing an end surface of a connector from which a guide pin protrudes in an axial direction wherein the guide pin has a predetermined pin length (GL) in the axial direction, the adhesive layer being elastically deformable when subjected to contact with the guide pin; and
a holding part that composes a bottom part and a side wall part for holding the adhesive layer while exposing at least the exposed surface, wherein
when the connector is pressed into the adhesive layer toward the bottom part, a leading tip of the guide pin comes into contact with the adhesive layer at a contact position, deforming the exposed surface as the guide pin projects towards the bottom part such that the exposed surface wraps the guide pin, and
a distance measured from the contact position to the side wall part, which is defined in a direction perpendicular to the axial direction of the guide pin, is greater than the pin length of the guide pin,
the adhesive layer is in a cuboid shape, having a length in a length direction (LD), a width in a width direction (WD) and a height in a height direction (HD), each of the length, width and height directions being perpendicular to the other two directions,
the side wall part has a first side wall part and a second side wall part that are arranged in parallel to face each other at both ends of the holding part in the width direction such that the adhesive layer, which is accommodated in the holding part, is sandwiched between the first side wall part and the second side wall part in the width direction,
the holding part has no side wall at both ends in the length direction such that the adhesive layer is not hold in the length direction,
the height of the adhesive layer is greater than the pin length of the guide pin, and
the length of the adhesive layer is greater than a length of the holding part, which is measured in the length direction, such that the adhesive layer is protruded from the holding part in the length direction.

3. The cleaner according to claim 2, wherein
each of the first and second side wall parts has a tip portion facing toward the end surface of the connector in the height direction, and
the exposed surface of the adhesive layer is flush with the tip portions while the adhesive layer is contained in a recessed portion that is formed with the bottom part and the first and second side wall parts.

4. A connector and a cleaner for cleaning the connector, wherein the connecter comprises a guide pin and an end surface from which the guide pin protrudes in an axial direction wherein the guide pin has a predetermined pin length (GL) in the axial direction, and the cleaner comprises an adhesive layer having an exposed surface facing the end surface of the connector, and being elastically deformable when subjected to contact with the guide pin; and a holding part that composes a bottom part and a side wall part wherein the adhesive layer sits on the bottom part, and the side wall part extends perpendicular to the bottom part to hold the adhesive layer while exposing at least the exposed surface, when the connector is pressed into the adhesive layer in a manner that the axial direction of the guide pin is oriented perpendicular to the bottom part, a leading tip of the guide pin comes into contact with the exposed surface of the adhesive layer at a contact position, deforming the exposed surface as the guide pin projects towards the bottom part such that the exposed surface wraps the guide pin, a distance measured from a center of the contact position to the side wall part, which is defined in a direction perpendicular to the axial direction of the guide pin, is greater than the pin length of the guide pin, the adhesive layer is in a cuboid shape, having a length in a length direction (LD), a width in a width direction (WD) and a height in a height direction (HD), each of the length, width and height directions being perpendicular to the other two directions, the adhesive layer has a first adhesive side surface and a second adhesive side surface that are perpendicular to the exposed surface, facing each other either in the width direction or in the length direction, the side wall part has a first side wall part and a second side wall part facing each other, in the holding part, the first adhesive side surface and the first side wall part face each other, the second adhesive side surface and the second side wall part face each other wherein the adhesive layer intervenes between the first side wall part and the second side wall part such that the first and second side wall parts hold the adhesive layer, the holding part has a recessed portion that is surrounded with the first and second side wall parts and the bottom part, into which the adhesive layer is contained, the recessed portion has a depth in the height direction and either the depth of the recessed portion or the height of the adhesive layer is greater than the pin length of the guide pin, each of the first and second side wall parts has a tip portion facing toward the end surface of the connector, and the exposed surface of the adhesive layer is protruded beyond the tip portions while the adhesive layer is contained in the recessed portion.

\* \* \* \* \*